(12) United States Patent
Legrand et al.

(10) Patent No.: US 8,476,583 B2
(45) Date of Patent: Jul. 2, 2013

(54) SYSTEM AND METHOD FOR WELLBORE MONITORING

(75) Inventors: Philippe Legrand, The Woodlands, TX (US); Graeme Young, The Woodlands, TX (US); Thomas N. Hendryx, Victoria, TX (US)

(73) Assignee: Baker Hughes Incorporated, Houston, TX (US)

( * ) Notice: Subject to any disclaimer, the term of this patent is extended or adjusted under 35 U.S.C. 154(b) by 490 days.

(21) Appl. No.: 12/713,413

(22) Filed: Feb. 26, 2010

(65) Prior Publication Data

US 2010/0219334 A1    Sep. 2, 2010

Related U.S. Application Data

(60) Provisional application No. 61/156,255, filed on Feb. 27, 2009.

(51) Int. Cl.
*G01V 5/04*    (2006.01)

(52) U.S. Cl.
USPC .................................................. 250/256

(58) Field of Classification Search
USPC ......... 250/256, 269.1, 269.2, 265; 73/152.18, 73/152.22, 152.31, 152.33
See application file for complete search history.

(56) References Cited

U.S. PATENT DOCUMENTS

| | | | |
|---|---|---|---|
| 6,854,327 B2 | 2/2005 | Rambow et al. | |
| 7,946,341 B2 * | 5/2011 | Hartog et al. | 166/254.1 |
| 2001/0023614 A1 | 9/2001 | Tubel et al. | |
| 2005/0224229 A1 | 10/2005 | Blacklaw | |
| 2006/0214098 A1 * | 9/2006 | Ramos | 250/256 |

FOREIGN PATENT DOCUMENTS

| | | |
|---|---|---|
| WO | 03076887 A1 | 9/2003 |
| WO | 2005064300 A1 | 7/2005 |

OTHER PUBLICATIONS

Notification of Transmittal of the International Search Rerpot and the Written Opinion of the International Searching Authority, or the Declaration; International Searching Authority; Aug. 13, 2010.
Written Opinion of the International Searching Authority; Aug. 13, 2010.
Manfred Kreuzer, Strain Measurement with Fiber Bragg Grating Sensors. New Horizons . . . for your measurements. Jul. 16, 2007. www.hbm.com/.../strain-measurement-with-fiber-bragg-grating-sensors/ (Schweden).
Rigzone [online] Baker Hughes, Shell Unveil New Real-Time Compaction Imaging System. Retrieved on May 6, 2010. Retrieved from http://www.rigzone.com/news/article_pf.asp?a_id=77678.

* cited by examiner

*Primary Examiner* — David Porta
*Assistant Examiner* — Faye Boosalis
(74) *Attorney, Agent, or Firm* — Cantor Colburn LLP

(57) ABSTRACT

A system for monitoring a borehole includes: a borehole string configured to be disposed within the borehole and configured to direct a fluid into the earth formation for storage in the earth formation, the fluid including carbon dioxide; at least one optical fiber sensor disposed on the borehole string at a fixed location relative to the borehole string, the optical fiber sensor including a plurality of measurement units disposed therein along a length of the optical fiber sensor, the plurality of measurement units configured to cause a wavelength shift in an interrogation signal received in the at least one optical fiber sensor due to at least one of a strain and a deformation of the borehole string; and a processor configured to transmit the interrogation signal to the at least one optical fiber sensor, and calculate at least one of the strain and the deformation based on the wavelength shift.

19 Claims, 3 Drawing Sheets

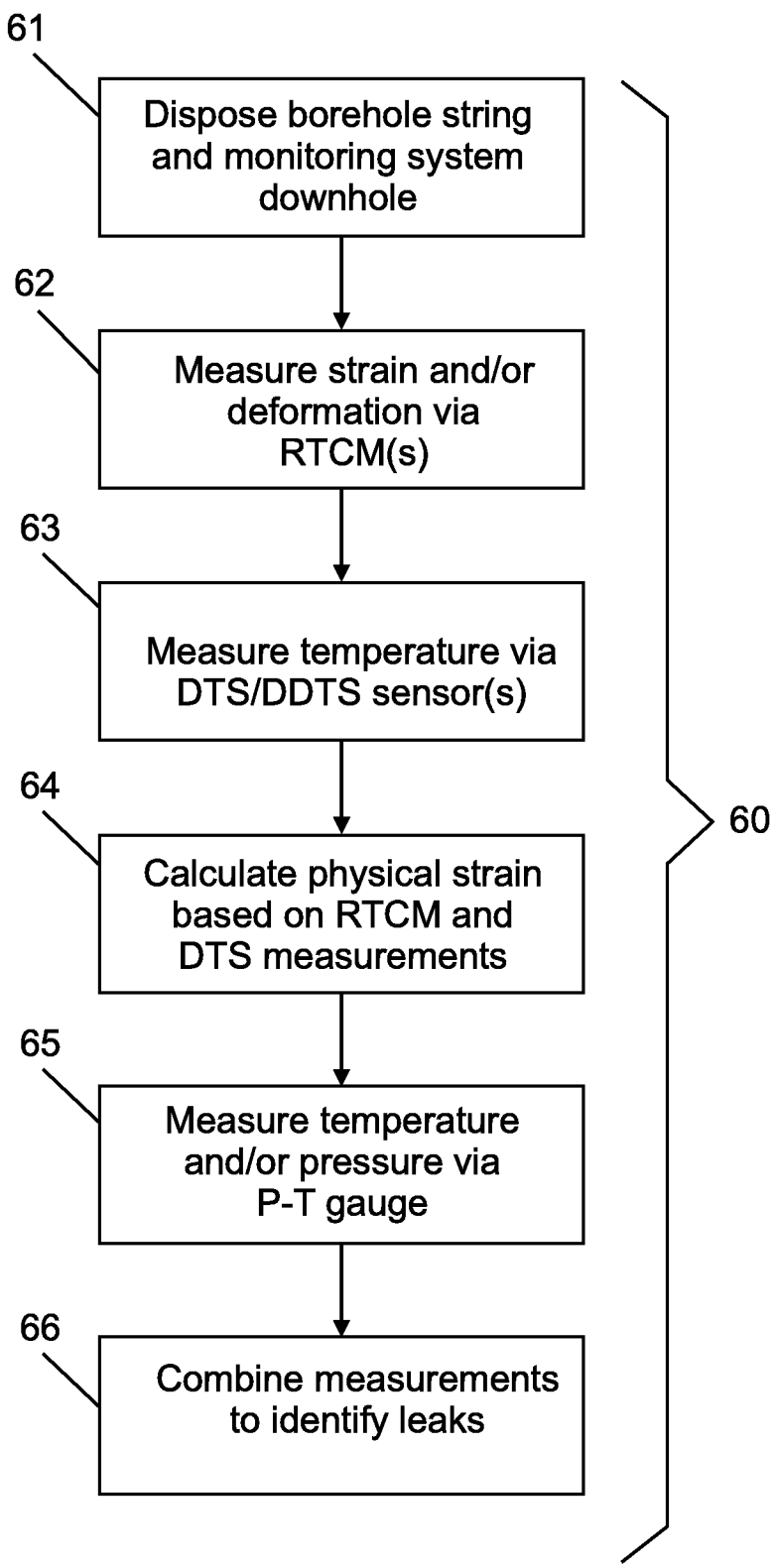

SYSTEM AND METHOD FOR WELLBORE MONITORING

BACKGROUND

Wellbores and underground formations are often subject to deformation over time. The result of such deformation may be the loss of production zones, the loss of a wellbore or leakage from a formation. The ability to detect deformation in a wellbore and/or formation may be useful for warning of impending collapse or buckling, and for allowing for changes in production practice and/or remedial action. Fiber optic techniques may be utilized to measure strain and/or temperature in a wellbore. Such techniques may be insufficient to effectively provide a complete indication of leaks or other fluid flow in a wellbore, well casing, formation or associated elements of a subterranean system.

SUMMARY

A system for monitoring a borehole in an earth formation includes: a borehole string configured to be disposed within the borehole, the borehole string configured to direct a fluid into the earth formation for storage in the earth formation, the fluid including carbon dioxide; at least one optical fiber sensor disposed on the borehole string at a fixed location relative to the borehole string, the optical fiber sensor including a plurality of measurement units disposed therein along a length of the optical fiber sensor, the plurality of measurement units configured to cause a wavelength shift in an interrogation signal received in the at least one optical fiber sensor due to at least one of a strain and a deformation of the borehole string; and a processor configured to transmit the interrogation signal to the at least one optical fiber sensor, and calculate at least one of the strain and the deformation based on the wavelength shift.

A system for monitoring a borehole in an earth formation includes: a borehole string configured to be disposed within the borehole, the borehole string configured to direct a fluid between the borehole and the earth formation; at least one optical fiber sensor disposed on the borehole string at a fixed location relative to the borehole string and including a plurality of measurement units disposed therein along a length of the optical fiber sensor, the at least one optical fiber sensor configured to measure at least one of a strain and a deformation in the borehole string; at least one of a distributed temperature sensing (DTS) sensor and a distributed discrete temperature sensing (DDTS) sensor disposed along a length of the borehole and configured to measure a temperature at a plurality of locations along the length; and a processor configured to interrogate the at least one optical fiber sensor to generate a strain profile of the borehole string based on at least one of the strain and the deformation, interrogate the at least one of the DTS sensor and the DDTS sensor to generate a temperature profile based on the temperature, calculate a thermal effect on the strain profile based on the temperature profile, and subtract the thermal effect from the strain profile to generate a physical strain profile.

A method of monitoring a borehole in an earth formation includes: disposing a borehole string within the borehole, the borehole string configured to direct a flow of fluid into the earth formation for storage in the earth formation, the fluid including carbon dioxide; transmitting an interrogation signal having a nominal wavelength into at least one optical fiber sensor, the optical fiber sensor disposed on the borehole string at a fixed location relative to the borehole string and including a plurality of measurement units disposed therein along a length of the optical fiber sensor; and receiving a plurality of return signals reflected by the plurality of measurement units and calculating at least one of a strain and a deformation of the borehole string based on a wavelength shift associated with each of the plurality of return signals.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3 is a flow chart illustrating an exemplary method of monitoring a borehole and/or a formation.

DETAILED DESCRIPTION

Systems and methods for monitoring wellbores and/or formations are provided. In one embodiment, the systems and methods are configured to detect fluid flow such as leaks in a wellbore and/or formation. Exemplary formations may include hydrocarbon formations and/or carbon dioxide ($CO_2$) storage reservoirs. For example, the systems and methods are utilized to assist in the detection of $CO_2$ leakage within a $CO_2$ storage reservoir and/or within an associated wellbore. In one embodiment, the systems include a distributed fiber optic strain measurement apparatus including, for example, one or more fiber Bragg grating optical fiber sensors, embedded in or otherwise fixedly disposed with a borehole string in a carbon capture and storage system. In one embodiment, the systems and methods include a combination of measurements from a distributed fiber optic strain measurement device, a distributed temperature sensing (DTS) measurement system and/or a distributed discrete temperature sensing (DDTS) measurement system, and/or one or more temperature/pressure gauges configured to monitor a borehole and/or a formation, for example, to detect leaks or other fluid flow in a wellbore and/or a formation. For example, individual temperature and/or pressure measurements may be used in combination with DTS and/or DDTS measurements, as well as compressional, deformation and/or strain measurements to provide a complete picture of the integrity and changes in a borehole and/or a formation, such as a carbon storage and sequestration system.

Figure 1:
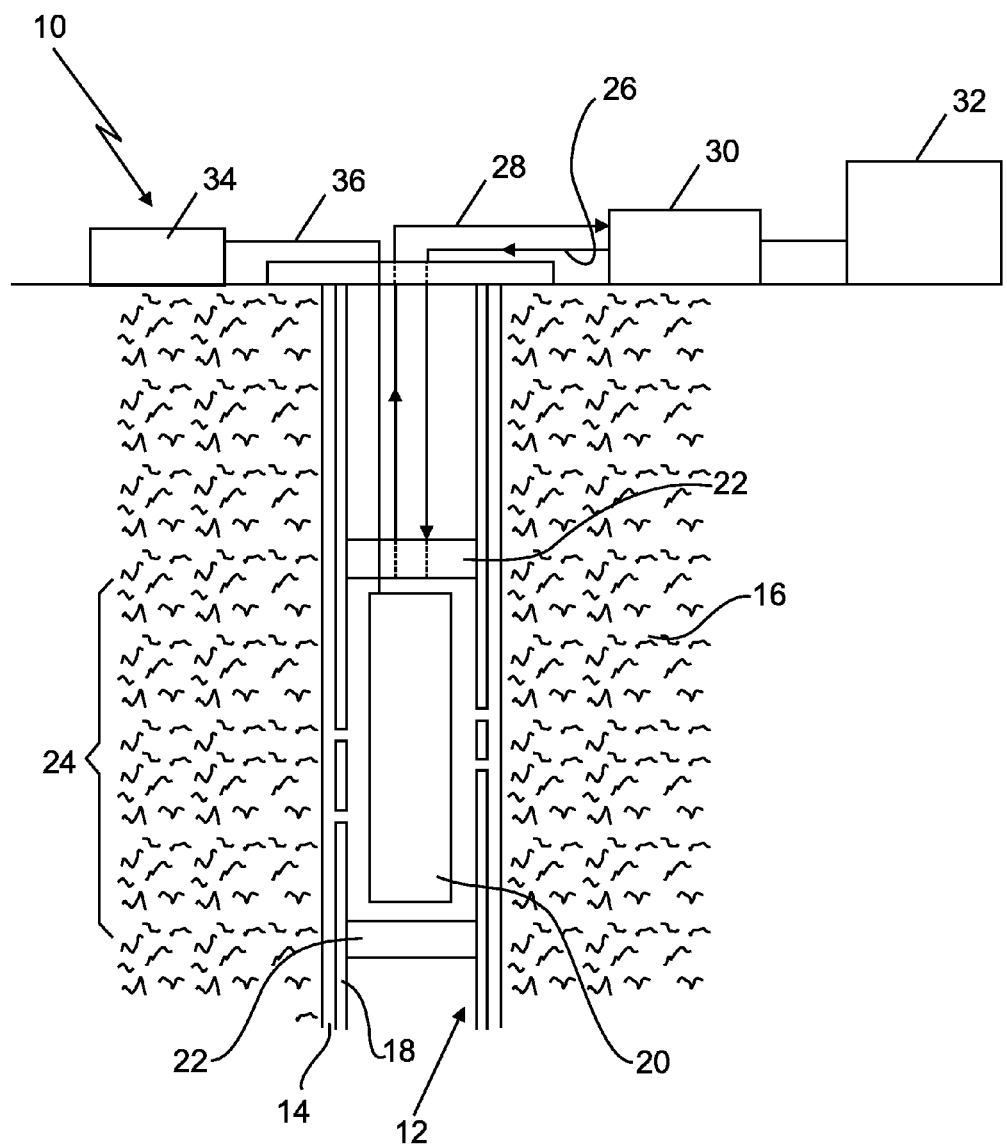
FIG. 1 is a cross-sectional view of a subterranean well drilling, evaluation, exploration and/or production system.

Referring to FIG. 1, an exemplary embodiment of a subterranean well drilling, evaluation, exploration and/or production system 10 includes a borehole string 12 that is shown disposed in a borehole 14 that penetrates at least one earth formation 16 during a subterranean operation. The borehole string 12 includes any of various components to facilitate subterranean operations. As described herein, "borehole" or "wellbore" refers to a single hole that makes up all or part of a drilled well. As described herein, "formations" refer to the various features and materials that may be encountered in a subsurface environment and surround the borehole. In one embodiment, the borehole 14 is a cased borehole including a casing 18. A borehole and/or formation monitoring system 20 is disposed with the borehole string 12 and/or the casing 18.

The borehole string 12 and/or the casing 18 includes, for example, one or more pipe sections or coiled tubing that extend downward into the borehole 14. The casing 18 is made from any material suitable for withstanding downhole conditions such as pressure, temperature and chemical action. Examples of such materials include steel, heat treated carbon steel, stainless steel, aluminum, titanium, fiberglass and other materials. In one embodiment, the casing 18 includes a plurality of pipe segments or casing joints connected together via threaded joints or other connection mechanisms. The casing 18 may extend any length of the borehole. For example, the borehole 14 may include a full casing extending from a surface or near surface location to a selected depth or a liner that is suspended in the borehole 14. In one embodiment, the borehole string 12 and/or the casing 18 form a subterranean injection and/or production system 10.

The borehole string 12 is not limited to an injection or production string. For example, the system 10 may include a drilling system and/or a bottomhole assembly (BHA). Various measurement tools may be incorporated into the system to affect measurement regimes such as wireline measurement applications or logging-while-drilling (LWD) applications. Furthermore, the monitoring system 20 is not limited to the embodiments described herein, and may be disposed with any suitable carrier. A "carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other carrier examples include casing pipes, wirelines, wireline sondes, slickline sondes, drop shots, downhole subs, bottom-hole assemblies, and drill strings.

In one embodiment, the system 10 includes isolation mechanisms such as packers 22 positioned uphole and downhole relative to at least one selected portion of the borehole 14 to hydraulically isolate the selected portion. The isolated portion may be configured as an injection and/or production zone 24 (referred to herein as an "injection/production zone") to allow for the flow of gas or other fluids between the formation 16 and the borehole string 12 and/or a surface location. As described herein, "fluid" refers to gases such as $CO_2$, downhole fluids such as formation fluids and drilling or production fluids, other flowable materials and any combination thereof. Any number of injection/production zones 24 may be formed in the borehole 14. In one embodiment, the injection/production zone includes one or more openings 25, such as apertures in the borehole string 12 and or fluid ports to allow fluid to pass between the formation 16 and the injection/production zone 24.

In one embodiment, the monitoring system 20 is disposed within the injection/production zone 24. For example, the monitoring system 20 is at least partially disposed in a fixed relationship relative to the borehole string 12 and/or casing 18 in the injection/production zone 24 or any other selected location in the borehole 14.

In one embodiment, an injection conduit 26 such as an injection pipe string is connected in fluid communication with the injection/production zone 24. The system 10 may also include a production conduit 28 in fluid communication with the injection/production zone 24 to allow for formation fluids such as oil and gas to be extracted from the formation 14.

In one embodiment, the system 10 is configured to facilitate the storage of $CO_2$ in the formation 14. For example, the system 10 is a Carbon Capture and Storage/Sequestration (CCS) system. In this embodiment, the injection/production zone 24 is configured in fluid communication via the injection conduit 26 with a fluid injection system 30 located at, for example, a surface location. The CCS system 10 includes a $CO_2$ or other fluid source 32, such as a fossil fuel power plant and/or a surface storage system configured to house gases such as $CO_2$ resulting from combustion processes. The gases, in one embodiment, include $CO_2$ and include exhaust gases and/or other gases (e.g., gases resulting from chemical reactions) resulting from the combustion processes. In one embodiment, the fluid injection system 30 and/or the fluid source 32 include mechanisms for liquefication of $CO_2$ and other gases desired to be stored in the formation.

In one embodiment, the monitoring system 20 is equipped with transmission equipment to communicate ultimately to a surface processing unit 34. Such transmission equipment may take any desired form, and different transmission media and connections may be used. In one example, the monitoring system 20 is coupled to the surface processing unit 34 via at least one fiber optic communications conduit 36 to transmit communication signals such as interrogation and return signals.

In one embodiment, the surface processing unit 34, the monitoring system 20 and/or other components of the system 10 include devices as necessary to provide for storing and/or processing data collected from the monitoring system 20 and other components of the system 10. Exemplary devices include, without limitation, at least one processor, storage, memory, input device, communications adapter, optical fiber coupler, splice box, output devices and the like.

Figure 2:
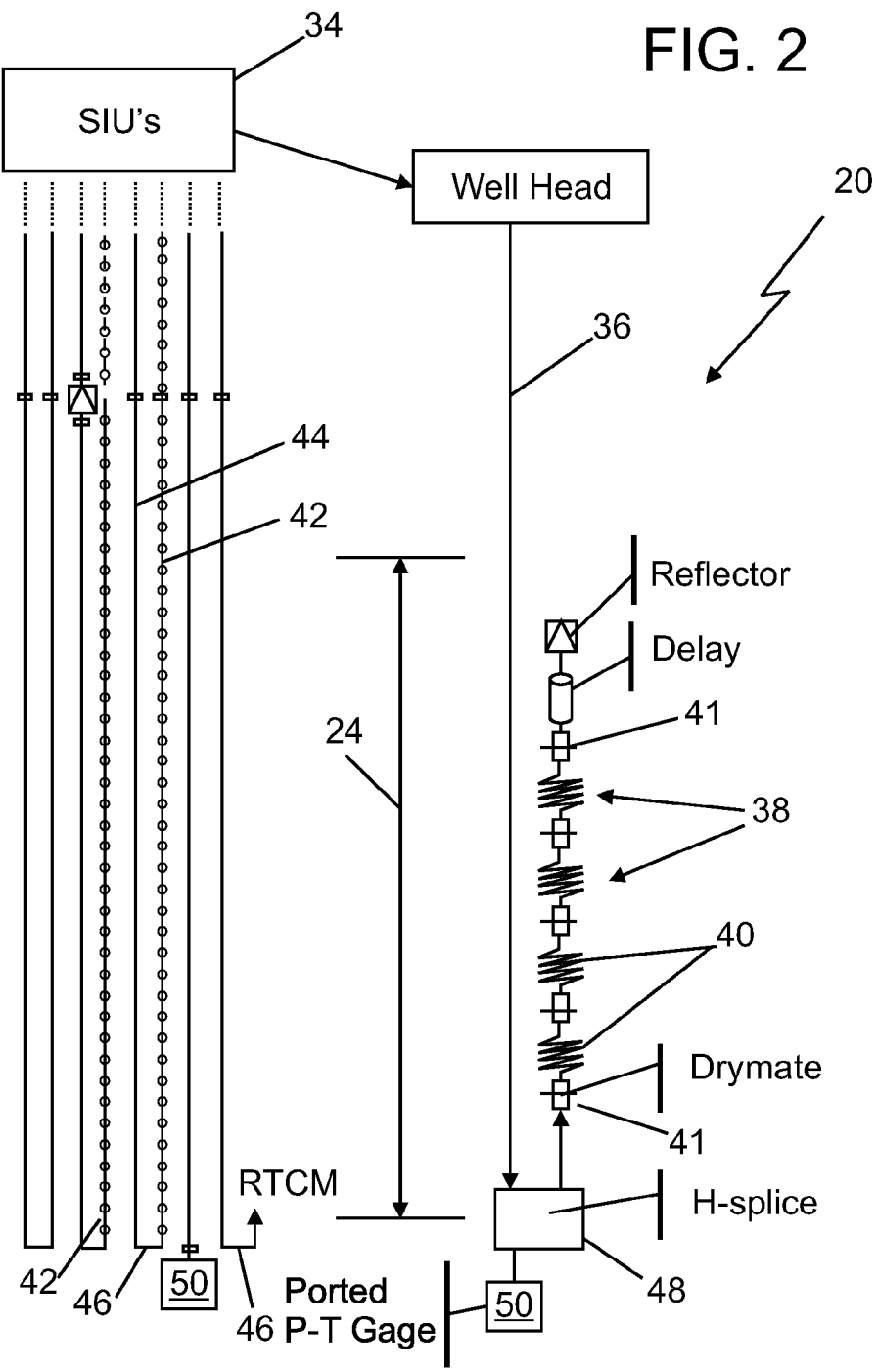
FIG. 2 is a cross-sectional view of an exemplary embodiment of a borehole and/or formation monitoring system.

Referring to FIG. 2, an exemplary embodiment of the monitoring system 20 is shown.

The monitoring system 20 includes a real time distributed fiber optic strain measurement device 38, referred to herein as a real time compaction monitor (RTCM) 38. The RTCM 38 includes at least one fiber optic sensor 40 disposed at a fixed position relative to the borehole casing 18 and/or the borehole string 12. In one embodiment, the fiber optic sensor 40 includes a plurality of measurement units formed along the length of at least one optical fiber. Exemplary measurement units include Fiber Bragg Gratings (FBG). In one embodiment, the fiber optic sensor 40 is a plurality of optical fiber sensors disposed in one or more cables or other conduits.

The RTCM 38 is configured to deform due to displacements, deformations and strains in the borehole string 12 and/or casing 18. The RTCM 38 detects and measures strain or deformation in the borehole string 12 due to a corresponding deformation or bending (e.g., microbending) of the optical fiber sensor 40. The measurement units reflect an interrogation signal transmitted from, for example, the surface processing unit 34, and wavelength shifts in a return signal relative to the interrogation signal indicate strain or deformation at a corresponding location of each measurement unit. In one embodiment, the measurement units are imbedded or manufactured in the optical fiber core to respond to a selected wavelength or wavelength bandwidth that will alter predictably with changes in strain or deformation.

In the example shown in FIG. 2, one or more RTCMs 38 are disposed in a fixed relationship with a selected portion of the borehole string 12. In one embodiment, the optical fiber sensors 40 are wrapped around the borehole string 12 or otherwise disposed at the borehole string in a helical path. The optical fiber sensors 40 may be attached to the borehole string 12 and/or disposed in a groove or other passage in the exterior or interior wall of the borehole string 12. In one embodiment, a fiber optic joint or connector 41, such as a drymate connector, is operably connected to each RTCM 38 to allow the RTCM 38 to be operably connected to additional RTCMs 38 or other components of the system 10. Any number of RTCMs 38 may be positioned at the borehole string 12, and the number and position of the RTCMs 38 relative to the borehole string 12 is not limited, for example, only to an interrogator optical budget.

In one embodiment, the monitoring system 20 includes at least one distributed temperature sensing (DTS and/or DDTS) system including at least one optical fiber sensor 42, referred to herein as a "DTS/DDTS sensor" 42. The DTS/DDTS sensor 42 includes at least one optical fiber configured for use in a DTS and/or DDTS system (referred to herein as a "DTS/DDTS fiber") and multiple temperature sensing locations along the DTS/DDTS fiber. The DTS/DDTS fiber may be fixedly attached to the borehole string. In one embodiment, the DTS/DDTS sensor 42 is disposed within a single cable or cable bundle. The DTS/DDTS sensor 42 is not limited to the embodiments described herein. The DTS/DDTS sensor 42 may include any optical system capable of generating temperature measurements at a plurality of locations.

The DTS/DDTS fiber includes a plurality of sensing locations along the length of the fiber which may be subject to various downhole temperatures. Temperature measurements may be taken at each of the plurality of sensing locations in a selected portion, such as the injection/production zone 24. The DTS fiber may be any optical fiber usable with DTS applications, including for example a Raman DTS fiber, which may be considered any optical fiber that can produce a sufficient level of Raman scattering intensity for the distributed temperature measurements. The DDTS fiber may be any optical fiber including, for example, a plurality of discrete measurement units such as FBGs. The DDTS fiber, in one embodiment, includes any optical fiber usable with a DDTS application, which includes, for example, an optical frequency domain reflectometry (OFDR) based interrogation technique to interrogate the FBGs.

In one embodiment, the DTS/DDTS sensor 42 is connected in communication with the surface processing unit 34. The DTS/DDTS fiber(s) may be single ended fiber for single ended DTS and DDTS or dual ended fiber for dual ended DTS. The DTS/DDTS fiber(s), in one embodiment, include a measurement portion disposed along the borehole 14 and a communication portion configured to transmit temperature interrogation signals, and DTS and/or DDTS return signals, between the measurement portion and the surface processing unit 34. In one embodiment, the DTS/DDTS sensor 42 is in communication with the surface processing unit 34 via a separate communication optical fiber 44. The communication portion or the communication optical fiber 44 is disposed, for example, in the communications conduit 36. The DTS/DDTS sensor 42 and the communication optical fiber 44 may be connected via a splice 46 or other suitable optical connector. The surface processing unit 34, in one embodiment, includes a receiver for generating temperature data from the signals and a processor for processing a return signal and determining a relative temperature value based on the received signal.

The RTCM 38 and/or the DTS/DDTS sensor 42 may be operably connected to the communications conduit 36 via a suitable connection mechanism 48, such as but not limited to a splice box and/or an H-splice. The connection mechanism 48 is configured to transmit interrogation signals and return signals between the RTCM 38 and/or the DTS/DDTS sensor 42 and the surface processing unit 34.

In one embodiment, the monitoring system 20 includes at least one pressure and/or temperature (P-T) gauge 50 disposed at a selected location in the borehole 14. The P-T gauge 50 is any suitable device, such as an electronic or fiber optic temperature and/or pressure device, suitable for taking discrete downhole temperature and/or pressure measurements at selected locations in the borehole 14. In one embodiment, the P-T gauge 50 is positioned at selected fixed locations relative to the borehole string 12 to measure the downhole temperature and/or pressure in the borehole 14. In one example, a P-T gauge 50 is positioned above or below the injection/production zone 24 to establish a reference temperature, e.g., a geothermal temperature, to provide a reference point for relative DTS measurements. In another example, one or more P-T gauges 50 are positioned at one or more selected locations in the borehole 14, such as inside the injection/production zone 24, outside the injection/production zone 24, and proximate to an uphole and/or downhole side of a packer 22. Other locations may include locations in the borehole string annulus and proximate to hydraulic isolation components such as cement plugs.

In one embodiment, the P-T gauge 50 includes an electronic pressure gauge. For example, high resolution electronic pressure gauges having resolutions such as 0.0001 psi, 0.0001 to 0.0005 psi or 0.0001 to 0.001 psi are included in the P-T gauge 50. Such high resolution gauges may detect small changes in pressure to provide early notification of pressure changes and early notification of potential problems.

In one embodiment, at least one RTCM 38, at least one DTS sensor 42 and/or at least one P-T gauge 50 is disposed in the injection/production zone 24 and configured to monitor the integrity of the borehole string 12 (e.g., monitor cement microannulus conditions) and detect fluid flow indicative of leaks in the system 10. In one embodiment the surface processing unit 34 is configured to continuously or periodically monitor the borehole over a selected period of time via the at least one RTCM 38, at least one DTS sensor 42 and/or at least one P-T gauge 50.

Additional measurement assemblies may also be included to complement or facilitate monitoring operations. For example, one or more acoustic sensors are included in the borehole 14 to monitor and detect changes in the formation 14 and/or the borehole 12, such as changes in fluid flow.

FIG. 3 illustrates a method 60 of monitoring a borehole and/or a formation. In one embodiment, the method 60 is utilized in conjunction with a CCS system, although the method may be utilized in any subterranean system to monitor borehole string and/or formation integrity, as well as detecting leaks or other fluid flow in the borehole string and/or formation. The method 60 includes one or more stages 61-66. Although the method 60 is described in conjunction with the system 10 and the monitoring system 20 described above, the method 60 is not limited to use with these embodiments. In one embodiment, the method 60 includes the execution of all of stages 61-66 in the order described. However, certain stages may be omitted, stages may be added, or the order of the stages changed.

In the first stage 61, the borehole string 12, borehole casing 18 and/or other downhole assembly is disposed downhole. The borehole casing 18 may be disposed along an entire length of the borehole, or along selected portions of the borehole 14 to define one or more injection/production zones 24. The monitoring system 20 is disposed in a fixed relationship to the borehole casing 18. In one embodiment, a gas, downhole fluid or other fluid is injected into the packers 22 to inflate the packers 22 and define the injection/production zones 24. In one embodiment, one or more of the packers 22 may include repackers configured to react with a catalyst or the presence of heat or a chemical. In one embodiment, $CO_2$ and/or other gases, such as exhaust gases from a fossil fuel combustion system, are injected into the injection/production zone 24 and into the formation 16 for storage.

In the second stage 62, deformation and/or strain in the borehole casing 18 in the injection/production zone 24 is monitored via the RTCM 38. An electromagnetic signal having a selected wavelength, i.e., a nominal wavelength, is transmitted through the optical fiber sensors 40 as an interrogation signal to interrogate the borehole casing 18, such as via the surface processing unit 34. A return signal having a center wavelength is generated by the FBGs or other measurement units in the fiber optic sensors 40, and a difference between the center wavelength and the nominal wavelength is measured for each FBG location to generate a strain profile. In regions where the center and nominal wavelengths are at least substantially equivalent, no deformation or strain is detected. In regions where the center wavelength has shifted relative to the nominal wavelength, the strain and/or deformation is calculated based on the wavelength shift. For example, an inverse Fourier transform is utilized to determine strain at respective locations, and data analysis such as finite element analysis (FEA) is utilized to detect regions of the borehole casing 18 exhibiting strain above a selected threshold to identify elevated strain zones or elevated strain regions. The elevated strain zones detected by the RTCM 38 may be an indication of conditions such as excess pressure, a fluid or gas leak or other conditions. In one embodiment, the strain profile provides a three-dimensional image of the borehole casing based on strain and/or deformation measurements.

In the third stage 63, the DTS/DDTS sensor 42 is activated to measure temperature at various locations along the borehole 14. In one embodiment, a temperature interrogation signal having a nominal wavelength is transmitted into the DTS sensor 42 via, for example, the surface processing unit 34. Raman effect return signals are received and analyzed to calculate a temperature profile along the borehole 14. In one embodiment, calculating the temperature profile includes utilizing optical time-domain reflectometry (OTDR). For example, for DDTS sensors, an electromagnetic signal having a selected wavelength, i.e., a nominal wavelength, is transmitted through the optical fiber sensors 40 as an interrogation signal to interrogate the borehole casing 18, such as via the surface processing unit 34. A return signal having a center wavelength is generated by the FBGs or other measurement units in the DDTS sensor 42, and a difference between the center wavelength and the nominal wavelength is measured for each FBG location to generate a temperature profile. In regions where the center and nominal wavelengths are at least substantially equivalent, no significant temperature change is detected. In regions where the center wavelength has shifted relative to the nominal wavelength, the temperature is calculated based on the wavelength shift. In one embodiment, calculating the temperature profile includes utilizing optical frequency domain reflectometry (OFDR).

Monitoring changes in relative temperature via the DTS/DDTS sensor 42 provides indications of regions having altered temperatures relative to a reference DTS/DDTS temperature. In one example, the reference DTS/DDTS temperature signal is based on analysis of the DTS/DDTS data, such as an average signal value. In one embodiment, the reference DTS/DDTS temperature signal is a signal corresponding to the temperature interrogation signal. In one embodiment, monitoring changes in temperature includes detecting "cool spots", or regions of reduced temperature relative to the reference temperature signal that may be indicative of fluid or gas leakage from, for example, behind the casing 18. In one embodiment, "cool spots" are regions in the borehole and/or injection/production zone having a temperature that is lower than a reference temperature (e.g., geothermal temperature) by a selected threshold. This threshold may be on the order of a few tenths of a degree Celsius to a few degrees Celsius. For example, a threshold may be between 0.1 degrees and 10 degrees below the reference temperature.

In the fourth stage 64, the DTS temperature measurements are used to remove the portion of the strain and/or the deformation due to thermal effects. For example, relative temperature changes at selected strain regions are calculated and compared with known properties of the borehole casing to determine the amount of strain as a result of temperature changes in that region. This "thermal strain" portion is then subtracted from the measured strain to yield a physical strain, i.e., the strain due to pressure on the borehole casing 18 caused by conditions such as leaks in the formation.

In the fifth stage 65, temperature and/or pressure in the borehole 14 and/or the formation 16 is detected using the P-T gauge 50. An absolute geothermal temperature is measured and compared to DTS and/or DDTS measurement data to "pin down" the relative temperature measurements of the DTS/DDTS sensor 42 to the absolute temperature, i.e., provide a distributed profile of the absolute temperature along the borehole 14.

In addition, in one embodiment, the P-T gauge 50 is used to measure pressure in the borehole at locations such as above the uphole packer 22, in the injection/production zone 24 and below the downhole packer 22. Changes in pressure can be used to indicate that a leak is occurring in the injection/production zone 24 or other locations of the borehole 14 due to, for example, leaks in the formation 14 causing gas to enter the injection/production zone 24 or leaks in a packer 22.

In the sixth stage 66, the various measurements are utilized in conjunction to provide an accurate picture of strain and temperature in the borehole to detect regions of high pressure and/or leaks.

For example, the RTCM strain measurements are utilized to determine regions of elevated strain (i.e., strain above a selected threshold, selected for example, based on strain values known to indicate a potential problem). The DTS measurements may be utilized as described above to remove thermal effects and thus isolate the physical strain in the borehole casing 18, as well as monitor injection zone. The elevated strain regions are correlated with the cool spots identified via the DTS measurements to identify regions where a leak is occurring or the integrity of the borehole casing 18 is otherwise compromised.

For example, a region of elevated strain in the borehole string, coupled with a cool spot proximate to the region of elevated strain may be interpreted to indicate a $CO_2$ or other gas/fluid leak at that region. If the elevated strain and/or cool spot is located proximate to a packer, that may be interpreted to mean that there is a leak in the packer. Furthermore, differential pressure measurements by the P-T gauge may also be incorporated to note an increase or decrease in pressure, which can be utilized to further confirm the presence of a leak.

The apparatuses and methods described herein provide various advantages over existing methods and devices. For example, the systems and methods described herein allow for the effective monitoring of deformation in wellbores and/or formation. Such monitoring provides a more complete determination of deformation to allow for remedial action or changes in production to correct such deformations. Another exemplary advantage includes the combination of multiple strain, temperature and/or pressure measurements to obtain a complete picture of what is occurring in a formation/wellbore and any leaks that may be occurring.

In connection with the teachings herein, various analyses and/or analytical components may be used, including digital and/or analog systems. The apparatus may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention.

The invention claimed is:

1. A system for monitoring a borehole in an earth formation, comprising:
   a borehole string configured to be disposed within the borehole, the borehole string configured to direct a fluid into the earth formation for storage in the earth formation, the fluid including carbon dioxide;
   at least one optical fiber sensor disposed on the borehole string at a fixed location relative to the borehole string, the optical fiber sensor including a plurality of measurement units disposed therein along a length of the optical fiber sensor, the plurality of measurement units configured to cause a wavelength shift in an interrogation signal received in the at least one optical fiber sensor due to at least one of a strain and a deformation of the borehole string;
   at least one of a distributed temperature sensing (DTS) sensor and a distributed discrete temperature sensing (DDTS) sensor disposed along a length of the borehole and configured to measure a temperature at a plurality of locations along the length; and
   a processor configured to transmit the interrogation signal to the at least one optical fiber sensor, calculate at least one of the strain and the deformation based on the wavelength shift, generate a strain profile of the borehole string based on at least one of the strain and the deformation, interrogate the at least one of the DTS sensor and the DDTS sensor to generate a temperature profile based on the temperature, calculate a thermal effect on the strain profile based on the temperature profile, and subtract the thermal effect from the strain profile to generate a physical strain profile.

2. The system of claim 1, wherein the processor is configured to generate at least one of the strain and a deformation profile to determine one or more elevated strain regions in the borehole string.

3. The system of claim 2, wherein the processor is configured to identify wellbore strain that, if not addressed, can result in one or more fluid leaks in at least one of the borehole and the formation based on the one or more elevated strain regions.

4. The system of claim 2, wherein the processor is configured to correlate the one or more elevated strain regions with the temperature profile to identify a fluid leak in at least one of the borehole string and the formation.

5. The system of claim 1, wherein the plurality of measurement units includes a plurality of fiber Bragg gratings.

6. The system of claim 1, wherein the at least one optical fiber sensor is disposed within a hydraulically isolated injection zone in the borehole string.

7. The system of claim 1, wherein the injection zone is connected in fluid communication to a source of the fluid disposed at a surface location.

8. The system of claim 7, wherein the fluid includes gas generated from a surface combustion system.

9. A system for monitoring a borehole in an earth formation, comprising:
   a borehole string configured to be disposed within the borehole, the borehole string configured to direct a fluid between the borehole and the earth formation;
   at least one optical fiber sensor disposed on the borehole string at a fixed location relative to the borehole string and including a plurality of measurement units disposed therein along a length of the optical fiber sensor, the at least one optical fiber sensor configured to measure at least one of a strain and a deformation in the borehole string;
   at least one of a distributed temperature sensing (DTS) sensor and a distributed discrete temperature sensing (DDTS) sensor disposed along a length of the borehole and configured to measure a temperature at a plurality of locations along the length; and
   a processor configured to interrogate the at least one optical fiber sensor to generate a strain profile of the borehole string based on at least one of the strain and the deformation, interrogate the at least one of the DTS sensor and the DDTS sensor to generate a temperature profile based on the temperature, calculate a thermal effect on the strain profile based on the temperature profile, and subtract the thermal effect from the strain profile to generate a physical strain profile.

10. The system of claim 9, wherein the processor is configured to determine one or more elevated strain regions in the borehole string based on the physical strain profile.

11. The system of claim 10, wherein the processor is configured to identify one or more reduced temperature regions based on the temperature profile.

12. The system of claim 11, wherein the processor is configured to correlate the one or more elevated strain regions with the one or more reduced temperature regions to identify a fluid leak in at least one of the borehole string and the formation.

13. The system of claim 9, further comprising at least one discrete pressure measurement device disposed at a selected location in the borehole and configured to measure a pressure in the borehole.

14. The system of claim 9, further comprising at least one discrete temperature measurement device disposed at a selected location in the borehole and configured to measure an absolute temperature in the borehole.

15. The system of claim 14, wherein the processor is configured to compare the absolute temperature to the temperature profile and generate an absolute temperature profile.

16. A method of monitoring a borehole in an earth formation, comprising:

disposing a borehole string within the borehole, the borehole string configured to direct a flow of fluid into the earth formation for storage in the earth formation, the fluid including carbon dioxide;

transmitting an interrogation signal having a nominal wavelength into at least one optical fiber sensor, the optical fiber sensor disposed on the borehole string at a fixed location relative to the borehole string and including a plurality of measurement units disposed therein along a length of the optical fiber sensor;

receiving a plurality of return signals reflected by the plurality of measurement units, calculating at least one of a strain and a deformation of the borehole string based on a wavelength shift associated with each of the plurality of return signals and generating a strain profile of the borehole string based on at least one of the strain and the deformation;

interrogating at least one of a distributed temperature sensing (DTS) sensor and a distributed discrete temperature sensing (DDTS) sensor disposed along a length of the borehole to measure a temperature at a plurality of locations along the length, and generating a temperature profile based on the temperature; and calculating a thermal effect on the strain profile based on the temperature profile, and subtracting the thermal effect from the strain profile to generate a physical strain profile.

17. The method of claim 16, further comprising generating at least one of the strain profile and a deformation profile to determine one or more elevated strain regions in the borehole string, and identify one or more fluid leaks in at least one of the borehole and the formation based on the one or more regions of elevated strain.

18. The method of claim 17, further comprising identifying one or more reduced temperature regions based on the temperature profile, and correlating the one or more elevated strain regions with the one or more reduced temperature regions to identify a fluid leak in at least one of the borehole string and the formation.

19. The method of claim 18, further comprising measuring an absolute temperature in the borehole by at least one discrete temperature measurement device disposed at a selected location in the borehole, and comparing the absolute temperature to the temperature profile to generate an absolute temperature profile.

* * * * *